(12) United States Patent
Shimizu

(10) Patent No.: US 10,800,457 B2
(45) Date of Patent: Oct. 13, 2020

(54) VEHICLE FRONT PORTION STRUCTURE

(71) Applicant: TOYOTA JIDOSHA KABUSHIKI KAISHA, Toyota-shi, Aichi-ken (JP)

(72) Inventor: Kazuki Shimizu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 15/978,341

(22) Filed: May 14, 2018

(65) Prior Publication Data

US 2019/0016388 A1 Jan. 17, 2019

(30) Foreign Application Priority Data

Jul. 13, 2017 (JP) .................. 2017-137388

(51) Int. Cl.
| | |
|---|---|
| *B60L 53/12* | (2019.01) |
| *B62D 21/15* | (2006.01) |
| *B62D 21/11* | (2006.01) |
| *B62D 21/03* | (2006.01) |
| *B60L 3/00* | (2019.01) |
| *B62D 25/08* | (2006.01) |
| *B60K 1/04* | (2019.01) |

(52) U.S. Cl.
CPC ............ *B62D 21/152* (2013.01); *B60K 1/04* (2013.01); *B60L 3/0015* (2013.01); *B60L 53/12* (2019.02); *B62D 21/03* (2013.01); *B62D 21/11* (2013.01); *B62D 25/08* (2013.01); *B60K 2001/0438* (2013.01); *B60Y 2306/01* (2013.01)

(58) Field of Classification Search
CPC ...... B62D 21/152; B62D 25/08; B62D 21/11; B62D 21/03; B60L 3/0015; B60L 53/12; B60K 1/04; B60K 2001/0438; B60Y 2306/01; B60R 19/02
See application file for complete search history.

(56) References Cited

U.S. PATENT DOCUMENTS

| | | | | |
|---|---|---|---|---|
| 6,879,889 B2* | 4/2005 | Ross | .................... | B60L 53/124 701/22 |
| 7,144,039 B2* | 12/2006 | Kawasaki | ................ | B60K 1/04 280/784 |

(Continued)

FOREIGN PATENT DOCUMENTS

| | | |
|---|---|---|
| DE | 10 2014 018 753 A1 | 6/2016 |
| JP | 2011-255705 A | 12/2011 |

(Continued)

*Primary Examiner* — Pinping Sun
(74) *Attorney, Agent, or Firm* — Oliff PLC

(57) ABSTRACT

A vehicle front portion structure that includes: a first vehicle body frame that extends in a vehicle transverse direction at a vehicle front portion; a second vehicle body frame that is positioned at a rear side of the first vehicle body frame, and that extends in the vehicle transverse direction at the vehicle front portion; and a non-contact charger having a front side part that is joined to the first vehicle body frame and having a rear side part that is joined to the second vehicle body frame, wherein the non-contact charger includes: a power receiving coil, a cover having a charger bottom surface that is positioned beneath the power receiving coil, and a pair of left and right longitudinal direction frames that respectively extend in a vehicle longitudinal direction at left and right sides of the power receiving coil.

11 Claims, 13 Drawing Sheets

(56) References Cited

U.S. PATENT DOCUMENTS

| | | | | |
|---|---|---|---|---|
| 2005/0269895 | A1* | 12/2005 | Innami | B62D 5/0403 |
| | | | | 310/429 |
| 2010/0314182 | A1* | 12/2010 | Crain | B60L 53/18 |
| | | | | 180/60 |
| 2011/0006611 | A1* | 1/2011 | Baarman | H02J 7/025 |
| | | | | 307/104 |
| 2012/0025761 | A1* | 2/2012 | Takada | B60L 53/122 |
| | | | | 320/108 |
| 2012/0218068 | A1* | 8/2012 | Yamakawa | H01Q 1/3225 |
| | | | | 336/90 |
| 2012/0262002 | A1* | 10/2012 | Widmer | B60L 3/04 |
| | | | | 307/104 |
| 2013/0037365 | A1* | 2/2013 | Ichikawa | B60L 50/61 |
| | | | | 191/10 |
| 2014/0320078 | A1* | 10/2014 | Nakamura | B60L 53/36 |
| | | | | 320/108 |
| 2015/0227127 | A1* | 8/2015 | Miller | G10K 11/178 |
| | | | | 700/244 |
| 2015/0249348 | A1* | 9/2015 | Niizuma | B60L 53/36 |
| | | | | 307/104 |
| 2015/0360577 | A1* | 12/2015 | Greenwood | B60L 11/1829 |
| | | | | 320/108 |
| 2016/0031331 | A1* | 2/2016 | Altunyurt | B60L 53/60 |
| | | | | 320/108 |
| 2016/0243948 | A1* | 8/2016 | Asai | B60L 53/36 |
| 2016/0288837 | A1* | 10/2016 | Sagara | B62D 21/155 |
| 2017/0001531 | A1* | 1/2017 | Takatsu | B60L 53/36 |
| 2017/0012477 | A1* | 1/2017 | Shijo | H01F 27/28 |
| 2017/0040836 | A1* | 2/2017 | Ozaki | B60K 1/04 |
| 2017/0096170 | A1* | 4/2017 | Sasaki | B62D 21/155 |
| 2017/0136892 | A1* | 5/2017 | Ricci | B60L 53/66 |
| 2017/0158066 | A1* | 6/2017 | Tokura | H02J 7/025 |
| 2017/0237291 | A1* | 8/2017 | Tokura | B60L 5/00 |
| | | | | 320/108 |
| 2017/0368948 | A1* | 12/2017 | Kume | B60L 53/60 |
| 2018/0072184 | A1* | 3/2018 | Lang | B60K 1/04 |
| 2018/0339668 | A1* | 11/2018 | Ryu | B60K 1/04 |
| 2019/0039471 | A1* | 2/2019 | Moghe | H02J 50/90 |

FOREIGN PATENT DOCUMENTS

| | | | | |
|---|---|---|---|---|
| JP | | 2012-254778 A | 12/2012 | |
| JP | | 2014-226016 A | 12/2014 | |
| JP | | 2017-065519 A | 4/2017 | |
| WO | WO-2012132205 A1 * | 10/2012 | | B60L 53/12 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2017-137388 filed on Jul. 13, 2017, which is incorporated by reference herein.

BACKGROUND

Technical Field

The present disclosure relates to a vehicle front portion structure.

Related Art

Structures are known in which a non-contact charger is disposed at the lower portion of a vehicle front portion (see, for example, Japanese Patent Application Laid-Open (JP-A) No. 2014-226016). In the structure of JP-A No. 2014-226016, a power receiving coil that structures the non-contact charger is installed at the bottom surface of the front end portion of a floor panel between a sub-frame and a battery, and is disposed so as to span over the open portion of the front panel.

However, in the above-described related art, there is room for improvement with regard to transmitting collision load at the time of a front collision.

SUMMARY

An object of the present disclosure is to provide a vehicle front portion structure that has a non-contact charger, and that can effectively transmit collision load at the time of a front collision.

An aspect of the present disclosure is a vehicle front portion structure that includes: a first vehicle body frame that extends in a vehicle transverse direction at a vehicle front portion; a second vehicle body frame that is positioned at a rear side of the first vehicle body frame, and that extends in the vehicle transverse direction at the vehicle front portion; and a non-contact charger having a front side part that is joined to the first vehicle body frame and having a rear side part that is joined to the second vehicle body frame. The non-contact charger includes: a power receiving coil, a cover having a charger bottom surface that is positioned beneath the power receiving coil, and a pair of left and right longitudinal direction frames that respectively extend in a vehicle longitudinal direction at left and right sides of the power receiving coil.

DETAILED DESCRIPTION

First Embodiment

A vehicle front portion structure S1 relating to a first embodiment of the present disclosure is described hereinafter.

Note that arrow FR that is shown in the respective drawings indicates the vehicle front side, arrow UP indicates the vehicle upper side and arrow W indicates the vehicle transverse direction. Further, in the following description, when longitudinal, vertical and left-right directions are used, they refer to the longitudinal of the vehicle longitudinal direction, the vertical of the vehicle vertical direction and the left and right of the vehicle transverse direction, unless otherwise specified.

First, a vehicle 12, to which the vehicle front portion structure S1 is applied, is described by using FIG. 1 through FIG. 4.

Figure 1:
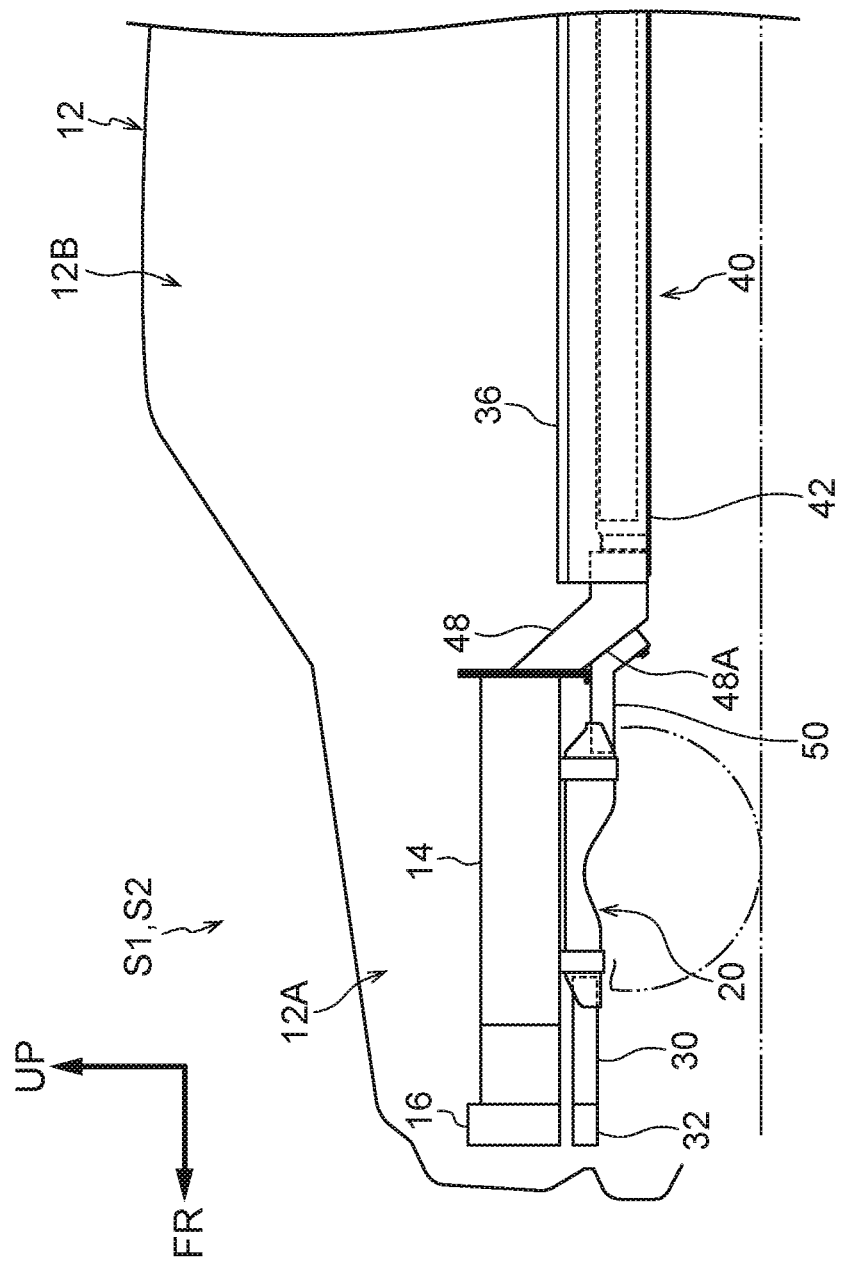
FIG. 1 is a side view showing an overview of the front side of a vehicle to which a vehicle front portion structure is applied.
Figure 2:
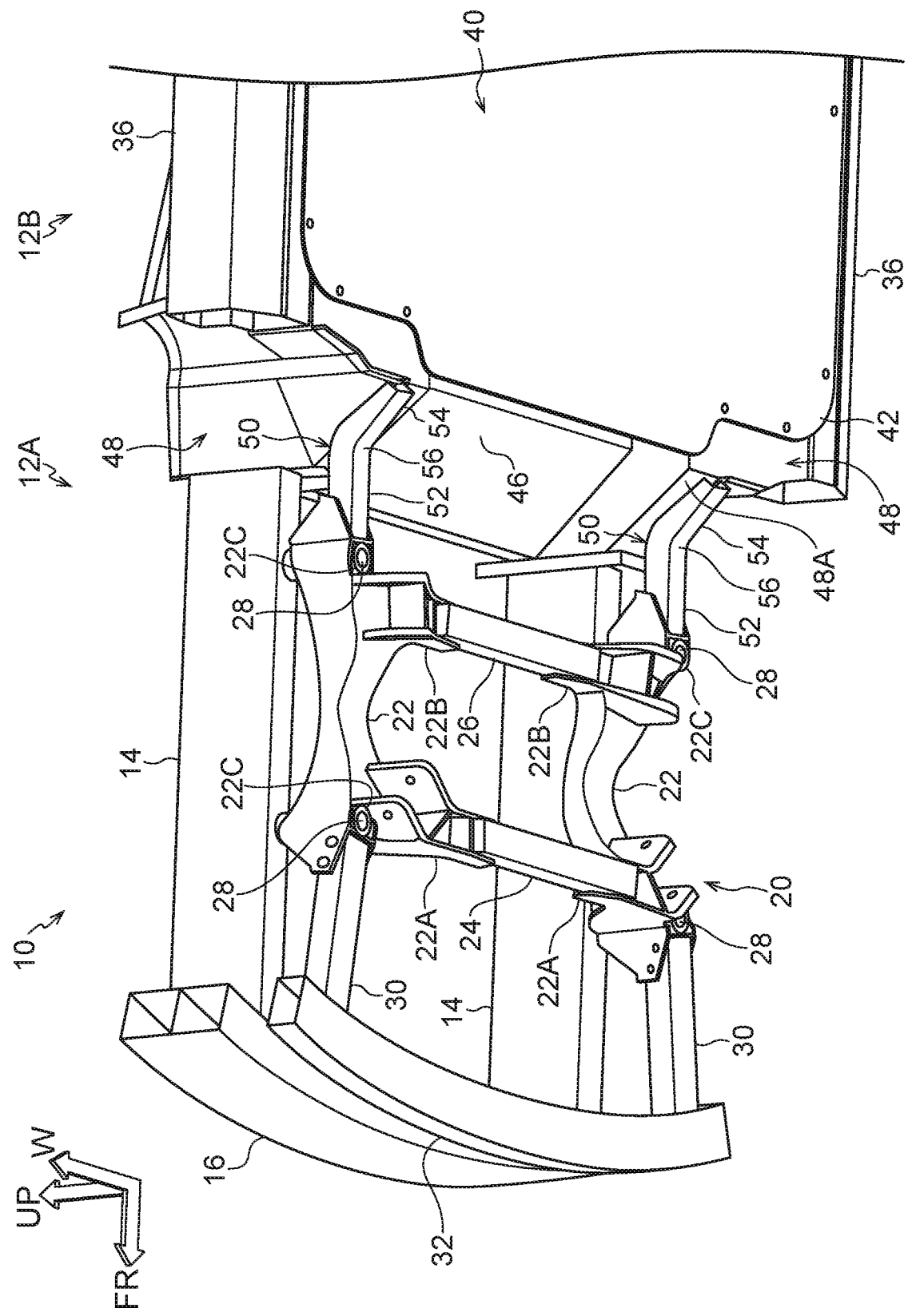
FIG. 2 is a perspective view from the lower side of the vehicle front portion structure.

The vehicle 12 is an electric automobile. As shown in FIG. 1, the vehicle 12 has a vehicle front portion chamber 12A and a vehicle cabin 12B. The vehicle front portion chamber 12A is positioned at the vehicle front side, and various types of members such as electrical components, a gear box, auxiliary equipment, and the like are accommodated at the interior thereof. The vehicle cabin 12B is adjacent to the rear side of the vehicle front portion chamber 12A.

Front side members 14 are disposed at the vehicle front portion chamber 12A. The front side members 14 are vehicle frame members that are provided as a pair at the left and the right and that extend in the vehicle longitudinal direction. The front side members 14 are disposed so as to be symmetrical with respect to the vehicle transverse direction center.

A bumper reinforcement (hereinafter called bumper RF) 16 is mounted to the front end of the front side members 14. The bumper RF 16 extends along the vehicle transverse direction, and connects the front ends of the pair of front side members 14 together. The rear ends of the front side members 14 are connected to battery front side portions 48 that are described later.

Figure 3:
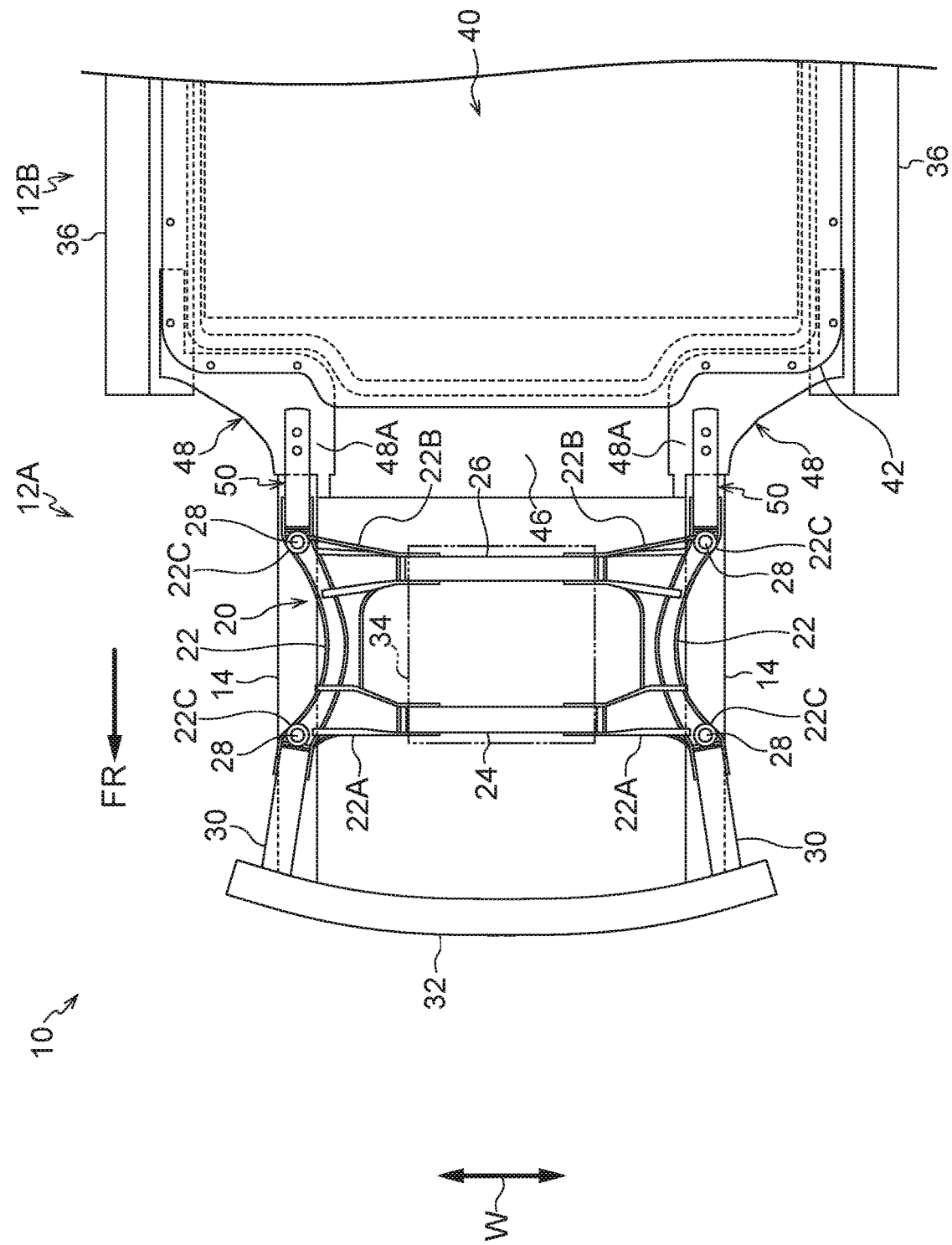
FIG. 3 is a bottom view showing the vehicle front portion structure.
Figure 4:
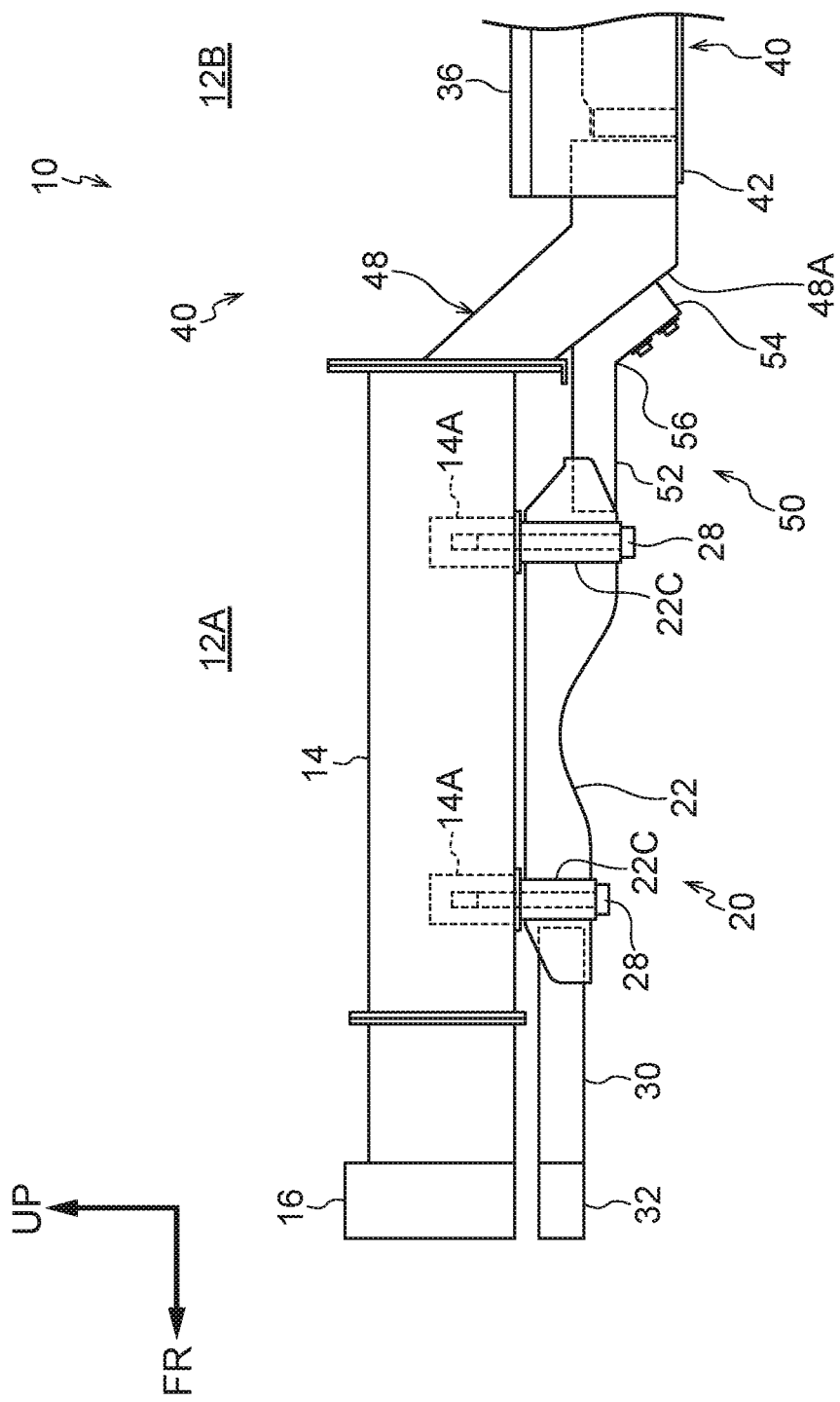
FIG. 4 is a side view showing the vehicle front portion structure.

A suspension member 20 is disposed at the lower side of the front side members 14. The suspension member 20 steerably supports the front tires by suspension arms and the like. The suspension member 20 has a pair of left and right side rails 22, a front cross 24 and a rear cross 26. The pair of side rails 22 are disposed beneath the front side members 14. The pair of side rails 22 are respectively disposed so as to be apart from the front side members 14 and so as to be substantially parallel to the front side members 14 as seen in a side view. As shown in FIG. 3, the side rails 22 respectively are made to be shapes that are gently curved such that the vehicle longitudinal direction intermediate portions thereof are convex toward the vehicle transverse direction inner side.

A side front end portion 22A that projects-out toward the vehicle transverse direction inner side is formed at the front end portion of the side rail 22. A side rear end portion 22B that projects-out toward the vehicle transverse direction inner side is formed at the rear end portion of the side rail 22. The side front end portions 22A of the pair of side rails 22 face one another in the vehicle transverse direction, and are connected together by the front cross 24. The side rear end portions 22B of the pair of side rails 22 face one another in the vehicle transverse direction, and are connected together by the rear cross 26. The front cross 24 and the rear cross 26 are closed-cross sectional structures that are rectangular in cross-section. The front cross 24 and the rear cross 26 correspond to the "first vehicle body frame" and the "second vehicle body frame", respectively.

Further, a bolt fastening portion 22C is formed at the front end portion and the rear end portion of the side rail 22 respectively. A bolt 28 is inserted into the bolt fastening portion 22C from the lower side, and is fastened (see FIG. 4) to a bolt fastening portion 14A that is formed at the front side member 14. The respective side rails 22 are supported by the bolts 28 at the vehicle longitudinal direction both end portions, so as to hang-down from the front side members 14.

The side rail 22, the side front end portion 22A and the side rear end portion 22B are structured integrally. In the present embodiment, the side rail 22, the side front end portion 22A and the side rear end portion 22B are manufactured by aluminum die casting by using aluminum as the main material. Further, the front cross 24 and the rear cross 26 are aluminum extrusion molded products that are manufactured by extrusion molding aluminum.

Lower side members 30 are connected to the respective front end portions of the pair of side rails 22. The lower side members 30 extend-out toward the vehicle front side from the front end portions of the side rails 22. The directions in which the lower side members 30 extend-out are direction that are tilted slightly toward the vehicle transverse direction outer sides with respect to the vehicle front side. A lower reinforcement 32 is mounted to the front ends of the lower side members 30. The lower reinforcement 32 extends in the vehicle transverse direction, and connects the front ends of the pair of lower side members 30 together. Further, the lower reinforcement 32 is disposed directly beneath bumper RF 16 so as to overlap the bumper RF 16 in the vehicle vertical direction.

A pair of left and right rockers 36 are disposed at the lower side of the vehicle cabin 12B. The rockers 36 extend in the vehicle longitudinal direction at the both outer side ends in the vehicle transverse direction. The rockers 36 are made to be closed cross-sectional structures.

The region between the pair of rockers 36 is a battery installation portion, and a battery pack 40 is installed thereat. The battery pack 40 has a battery case 42, which is formed in the shape of a box that is long in the vehicle longitudinal direction and is flat in the vehicle vertical direction, and plural battery modules that are accommodated at the interior of the battery case 42.

The battery front side portions 48 are provided at the front side of the battery installation portion. The battery front side portions 48 are provided as a left-right pair at the vehicle transverse direction both sides, and connect the rockers 36 and the front side members 14. Further, a dash cross 46 is provided so as to connect the pair of left and right battery front side portions 48 in the vehicle transverse direction (see FIG. 2 and FIG. 3). The dash cross 46 is positioned at the vehicle front side of the battery pack 40.

The side rails 22 of the suspension member 20 and the battery front side portions 48 are connected by connecting members 50. The connecting member 50 has a front side connecting portion 52, a bent portion 56 and a rear side connecting portion 54, in that order. The connecting member 50 has a closed cross-section that is rectangular.

The front end of the front side connecting portion 52 is fixed to the rear end of the side rail 22 at further toward the rear side than the bolt 28, and the front side connecting portion 52 extends rearward substantially parallel to the side rail 22. The rear side connecting portion 54 is bent toward the vehicle rear and lower side from the rear end of the front side connecting portion 52, and extends along an inclined surface 48A of the battery front side portion 48, and is fixed to the inclined surface 48A of the battery front side portion 48.

The non-contact charger 34 is described next by using FIGS. 5 through 8.

The non-contact charger 34 is a device (a power receiving device) that receives a supply of electric power in a non-contact manner from an external charger (power feeding device) and carries out charging of the battery. The non-contact charger 34 is rectangular as seen in plan view. The front side of the non-contact charger 34 is connected to the front cross 24, and the rear side is connected to the rear cross 26. Note that illustration of the non-contact charger 34 is omitted in FIGS. 1, 2 and 4.

Figure 5:
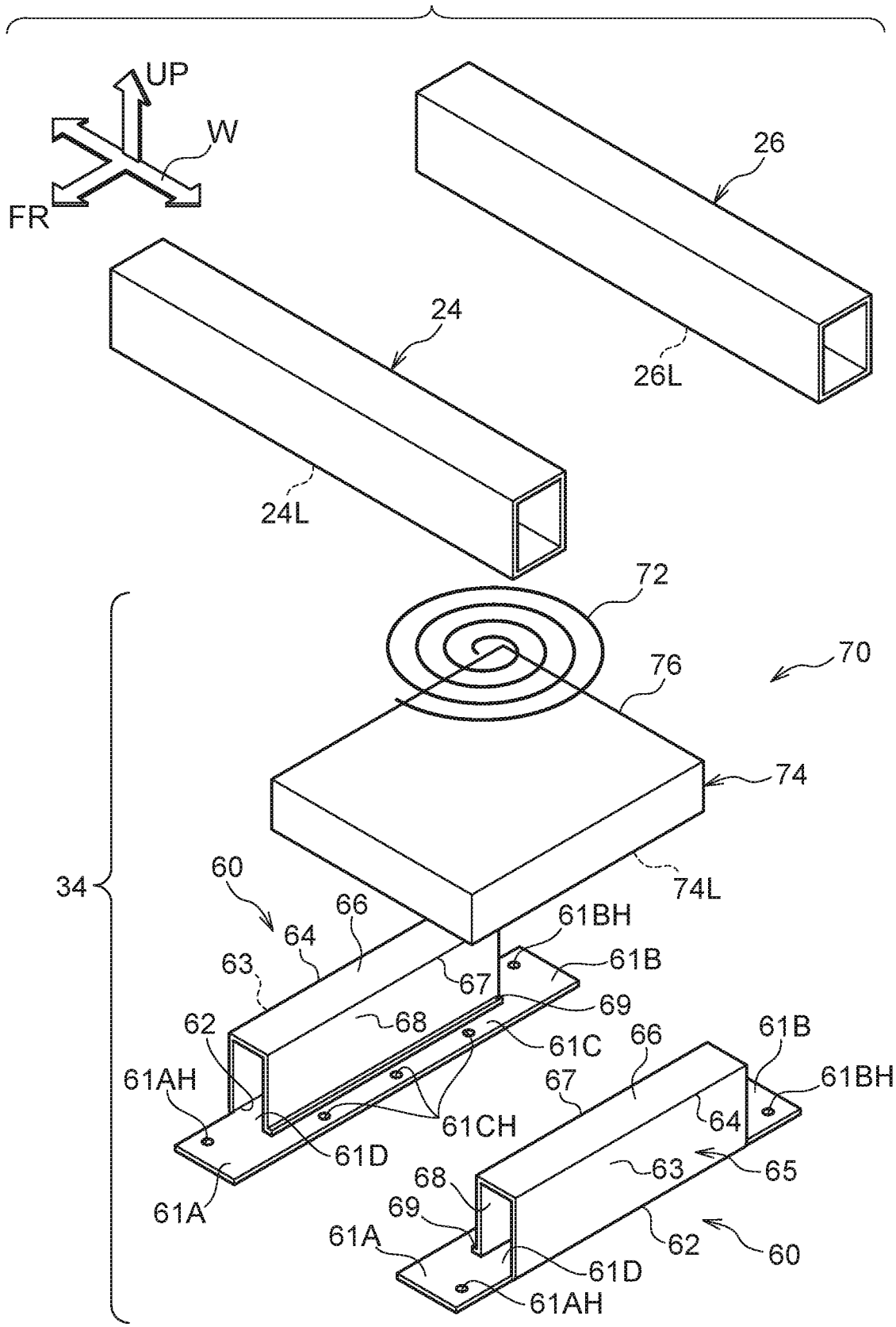
FIG. 5 is an exploded perspective view showing a non-contact charger of a first embodiment, together with a front cross and a rear cross of a suspension member.
Figure 6:
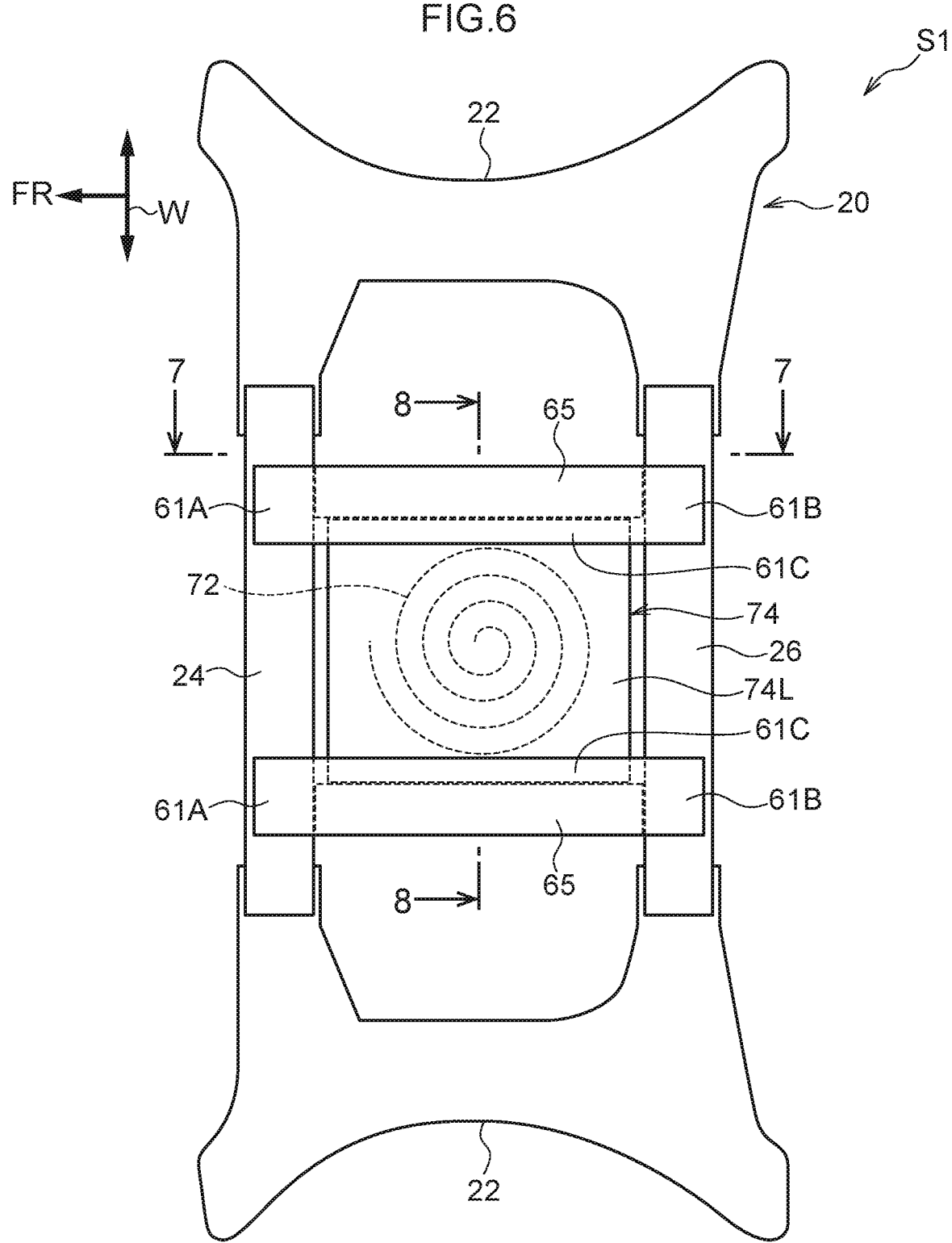
FIG. 6 is a bottom view that is seen from the vehicle lower side and shows the non-contact charger of the first embodiment together with the suspension member.

As shown in FIG. 5, the non-contact charger 34 is structured to include a charger main body 70 and main body supporting members 60. Thereamong, the charger main body 70 is the main structure, and has a power receiving coil 72, a resin cover 74 and a shield portion 76.

The resin cover 74 is shaped as a box that is substantially rectangular as seen in a plan view. The power receiving coil 72 is accommodated in the resin cover 74. The resin cover 74 has at least a bottom plate portion 74L that serves as a "charger bottom surface" and structures the bottom surface of the non-contact charger 34. The bottom plate portion 74L is disposed beneath the power receiving coil 72. The shield portion 76 prevents the magnetic field from leaking toward the upper side of the charger main body 70. The shield portion 76 is formed by a plate member made of aluminum for example, and is disposed above the power receiving coil 72.

At a first joining portion 61A and a second joining portion 61B, the main body supporting member 60 is joined by fastening to the front cross 24 and the rear cross 26 of the suspension member 20. At a main body supporting portion 61C, the main body supporting member 60 supports the charger main body 70. The main body supporting members 60 are provided as a left-right pair with respect to the charger main body 70, and support the left and right both sides of the charger main body 70. The pair of left and right main body supporting members 60 are structures that are substantially the same (have left-right symmetry). The main body supporting members 60 are formed by bending metal plates of aluminum or the like.

The main body supporting member 60 has a base portion 61 that is shaped as a flat plate that is substantially rectangular. A length direction one side (vehicle front side) end portion of the base portion 61 is the first joining portion 61A that is joined to the front cross 24 of the suspension member 20. The length direction other side (vehicle rear side) end portion of the base portion 61 is the second joining portion 61B that is joined to the rear cross 26. Fastening holes 61AH, 61BH, that are for joining to the front cross 24 and the rear cross 26 of the suspension member 20 by fastening, are formed in the first joining portion 61A and the second joining portion 61B, respectively. The first joining portion 61A is fastened from the lower side to a bottom surface 24L of the front cross 24 of the suspension member 20. The second joining portion 61B of the main body supporting member 60 is fastened from the lower side to a bottom surface 26L of the rear cross 26 (see FIG. 7).

A portion of the base portion 61 (in detail, a short-side direction one side of the base portion 61 that is substantially rectangular, i.e., the portion at the vehicle transverse direction inner side) is the main body supporting portion 61C that supports the charger main body 70. Fastening holes 61CH for the fastening of the charger main body 70 are formed in the main body supporting portion 61C. The plural fastening holes 61CH are formed so as to be lined-up in the length direction of the base portion 61. Both vehicle transverse direction ends of the bottom plate portion 74L of the resin cover 74 of the charger main body 70 are disposed on the main body supporting portions 61C of the pair of left and right main body supporting members 60 (see FIG. 8).

Portion 61D, which is adjacent to the short-side direction other side (the vehicle transverse direction outer side) of the main body supporting portion 61C, of the base portion 61 is a portion of a longitudinal direction frame 65. Namely, the long side, which is at the short-side direction other side, of the base portion 61 is connected to an outer plate portion 63 via a bent portion 62 that is at the length direction intermediate portion of this long side. The outer plate portion 63 is shaped as a flat plate that is rectangular and whose plate thickness direction is substantially the vehicle transverse direction. A bent portion 64 is formed at the upper end of the outer plate portion 63, and is connected to a top plate portion 66. At this bent portion 64, the top plate portion 66 is bent toward the vehicle transverse direction inner side, and the top plate portion 66 is shaped as a flat plate that is rectangular and whose plate thickness direction is substantially the vehicle vertical direction. A bent portion 67 that is bent downward is formed at the vehicle transverse direction inner side end portion of the top plate portion 66. The top plate portion 66 is connected to an inner plate portion 68 via the bent portion 67. The inner plate portion 68 is shaped as a flat plate that is rectangular and whose plate thickness direction is substantially the vehicle transverse direction. A flange portion 69 that is bent toward the vehicle transverse direction inner side is formed at the lower end of the inner plate portion 68. The flange portion 69 is joined to the base portion 61 by arc welding or spot welding or the like. Due thereto, the longitudinal direction frame 65, which is a closed cross-sectional structure whose cross-sectional shape orthogonal to the vehicle longitudinal direction is substantially rectangular, is formed by the portion 61D (the bottom plate portion 61D) of the base portion 61, the outer plate portion 63, the top plate portion 66 and the inner plate portion 68.

A reinforcing portion 65P that is substantially upside-down U-shaped in cross-section is formed at the portion 61D that is other than the first joining portion 61A and the second joining portion 61B that are in vicinities of the both length direction ends and the main body supporting portion 61C that is at the short-side direction one side, of the base portion 61 that is shaped as a flat plate that is substantially rectangular, i.e., the reinforcing portion 65P is formed at the portion 61D that is at the short-side direction other side and the length direction center of the base portion 61. The reinforcing portion 65P is connected to the base portion 61 so as to close-off the portion where the cross-sectional shape is open. Due thereto, the longitudinal direction frame 65, which has a closed cross-sectional structure and extends in the length direction of the base portion 61, is formed by the portion 61D of the base portion 61 and the reinforcing portion 65P.

Figure 7:
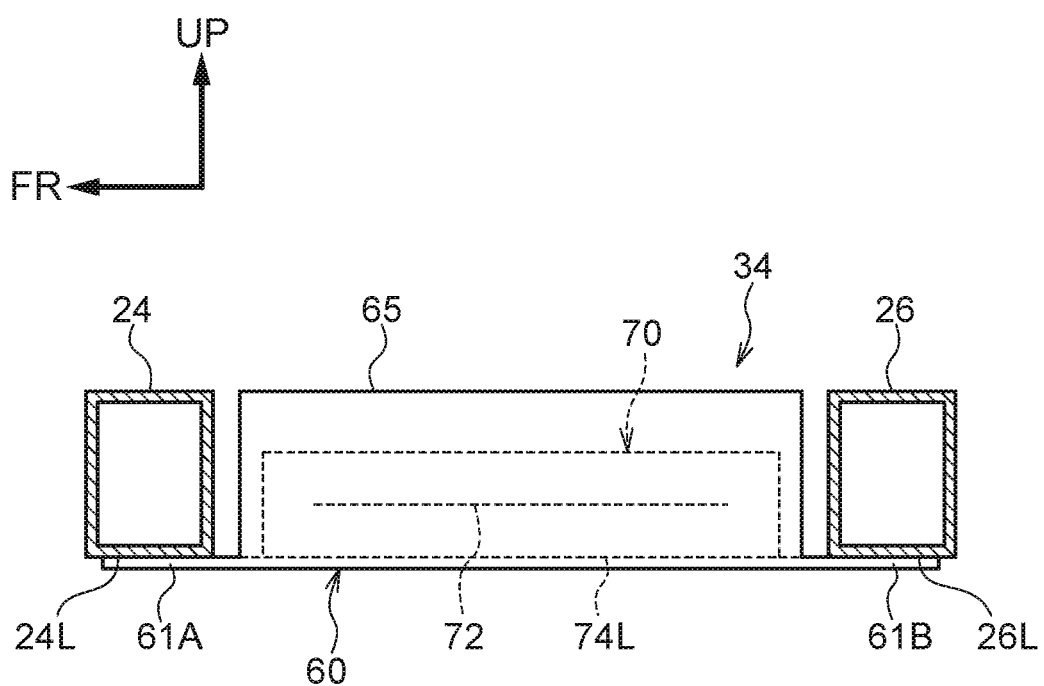
FIG. 7 is a cross-sectional view along line 7-7 of FIG. 6.
Figure 8:
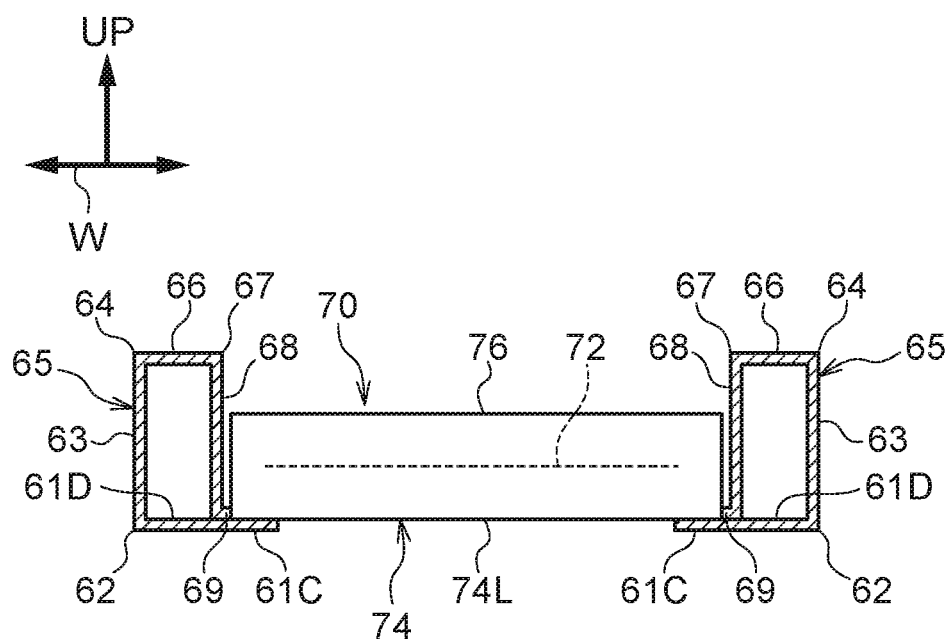
FIG. 8 is a cross-sectional view along line 8-8 of FIG. 6.

As shown in FIG. 7, the longitudinal direction frame 65 is disposed between the front cross 24 and the rear cross 26 of the suspension member 20. In detail, the outer plate portion 63, the top plate portion 66 and the inner plate portion 68, which are other than the bottom plate portion 61D, at the longitudinal direction frame 65 are in a state of overlapping the front cross 24 and the rear cross 26 as seen in a vehicle front view.

Due to the above, functionally speaking, the main body supporting member 60 can be said to have the first joining portion 61A and the second joining portion 61B that are joined to the front cross 24 and the rear cross 26, and the main body supporting portion 61C that supports the charger main body 70, and the longitudinal direction frame 65. The bottom plate portion 61D of the longitudinal direction frame 65, and the first joining portion 61A, the second joining portion 61B and the main body supporting portion 61C are all provided as the base portion 61 of the main body supporting member 60, and are disposed within the same plane.

Operation and Effects

Operation and effects of the present embodiment are described next.

In the present embodiment, the front cross 24 and the rear cross 26 of the suspension member 20 extend in the vehicle transverse direction at the vehicle front portion. Further, there is provided the non-contact charger 34 that is equipped with the power receiving coil 72 and the resin cover 74 that has the charger bottom surface (the bottom plate portion 74L) that is positioned beneath the power receiving coil 72. The front side of the non-contact charger 34 is joined to the front cross 24 of the suspension member 20, and the rear side of the non-contact charger 34 is joined to the rear cross 26. Therefore, at the time of a front collision, load that is inputted to the front cross 24 of the suspension member 20 is transmitted to the rear cross 26 via the non-contact charger 34.

Moreover, the non-contact charger 34 is structured to also include the pair of left and right longitudinal direction frames 65 that extend in the vehicle longitudinal direction at the left and right both sides of the power receiving coil 72. Therefore, load, which is inputted to the front cross 24 of the suspension member 20 at the time of a front collision, can be effectively transmitted to the rear cross 26 via the longitudinal direction frames 65. Thus, the rigidity of the suspension member 20 with respect to load in the longitudinal direction can be improved effectively.

Further, in the present embodiment, because the longitudinal direction frames 65 are closed cross-sectional structures, collision load can be transmitted even more effectively as compared with a form in which, for example, longitudinal direction frames are open cross-sectional structures that are substantially U-shaped in cross-section.

By the way, there are cases in which the charger rides-up on a curb or the like due to movement of the vehicle. In other words, there are cases in which a curb or the like is about to hit the charger from the lower side.

Here, in the present embodiment, the pair of left and right longitudinal direction frames 65 project-out further downward than the charger bottom surface (the bottom plate portion 74L). Therefore, even if a curb or the like is about to hit the charger from the lower side, the charger main body 70 being damaged by the curb or the like can be suppressed.

Further, in the present embodiment, the pair of left and right longitudinal direction frames 65 are disposed between the front cross 24 and the rear cross 26 of the suspension member 20. Therefore, at the time of a front collision, collision energy can be absorbed effectively by utilizing the longitudinal direction frames 65.

Namely, due to the longitudinal direction frames 65 being disposed between the front cross 24 and the rear cross 26 of the suspension member 20, at the time of a front collision, it is easy for the longitudinal direction frames 65 to be nipped between the front cross 24 and the rear cross 26 of the suspension member 20. Due to the longitudinal direction frames 65 being nipped between the front cross 24 and the rear cross 26 of the suspension member 20, the longitudinal direction frames 65 can be axially compressed or bendingly deformed. Due thereto, collision energy can be absorbed effectively.

Further, in the present embodiment, the non-contact charger 34 is structured to include the main body supporting members 60. The main body supporting members 60 are joined by fastening to the front cross 24 and the rear cross 26 of the suspension member 20, and support (the resin cover 74 of) the charger main body 70 of the non-contact charger 34. Further, the main body supporting members 60 have, as portions thereof, the longitudinal direction frames 65. Namely, the main body supporting members 60 that support the charger main body 70 also function as the longitudinal direction frames 65.

Therefore, the work of mounting to the vehicle is easy as compared with a form in which the parts for mounting the charger main body 70 to the vehicle body, and the longitudinal direction frames, are structured as separate parts.

Modified Example: Transverse Direction Frames

Figure 9:
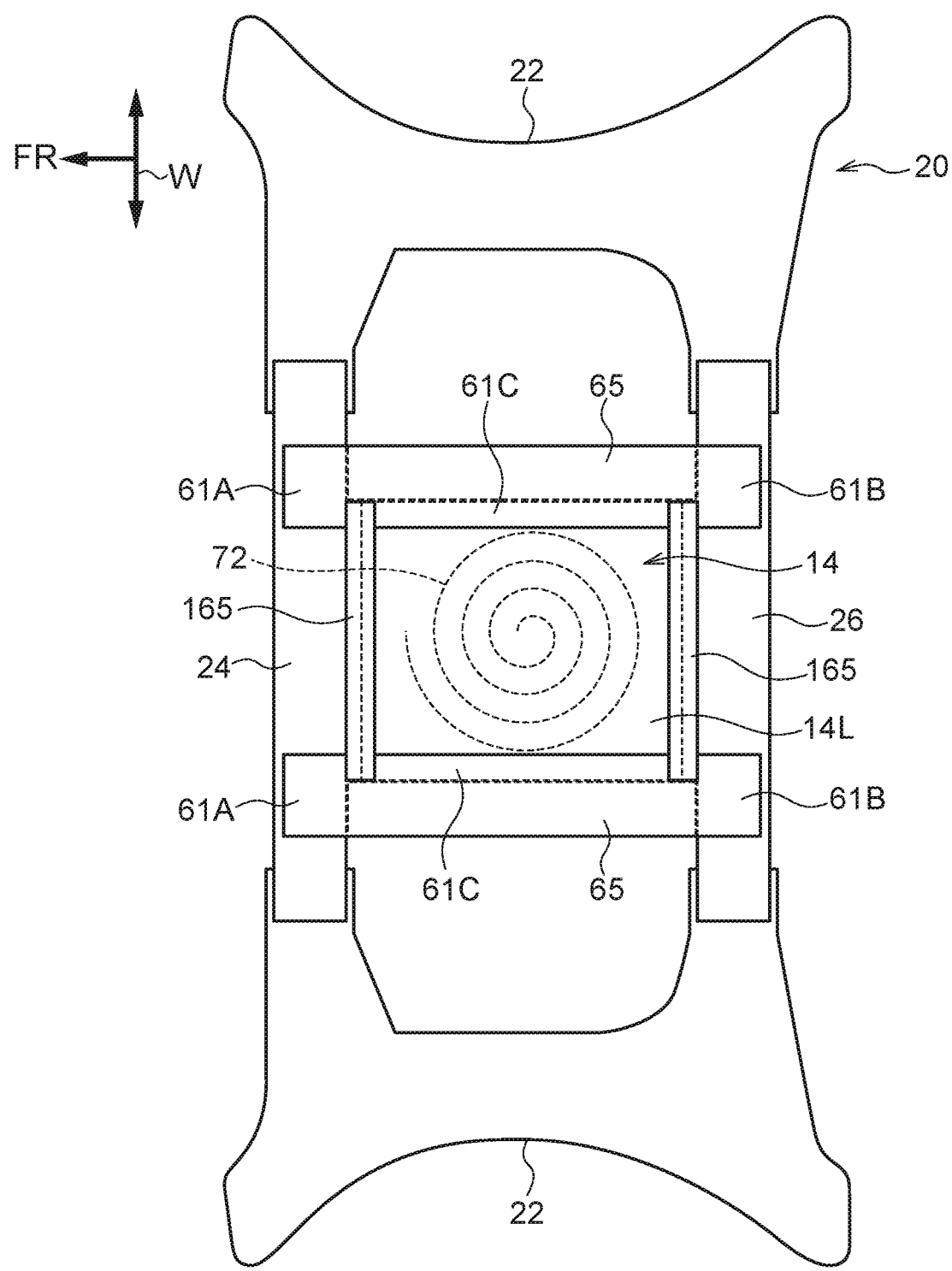
FIG. 9 is a bottom view showing a non-contact-charger relating to a modified example of the first embodiment.

Note that a non-contact charger 134 of a modified example that is illustrated in FIG. 9 may be provided instead of the non-contact charger 34 of the above-described embodiment. The non-contact charger 134 of the modified example is structured to further include a pair of front and rear transverse direction frames 165 at the non-contact charger 34 of the above-described embodiment. The pair of front and rear transverse direction frames 165 extend in the vehicle transverse direction at the front and rear both sides of the power receiving coil 72, and project-out further toward the lower side than the charger bottom surface (the bottom plate portion 74L). The transverse direction frames 165 are formed of a metal such as aluminum or the like.

In this modified example, at times when the vehicle is advancing forward or is traveling in reverse, a curb or the like colliding directly with the charger main body 70 of the non-contact charger 34 can be suppressed effectively.

Namely, at times when the vehicle 12 is advancing forward or is traveling in reverse, there is the concern that a curb or the like will directly collide with the charger. In this modified example, the non-contact charger 34 is structured to further include the pair of front and rear transverse direction frames 165, and the pair of front and rear transverse direction frames 165 extend in the vehicle transverse direction at the front and rear both sides of the power receiving coil 72. Due to the transverse direction frames 165 projecting-out further toward the lower side than the charger bottom surface (the bottom plate portion 74L), at times when the vehicle is advancing forward or is traveling in reverse, a curb or the like directly colliding with the charger main body 70 of the non-contact charger 34 is suppressed.

Second Embodiment

Figure 10:
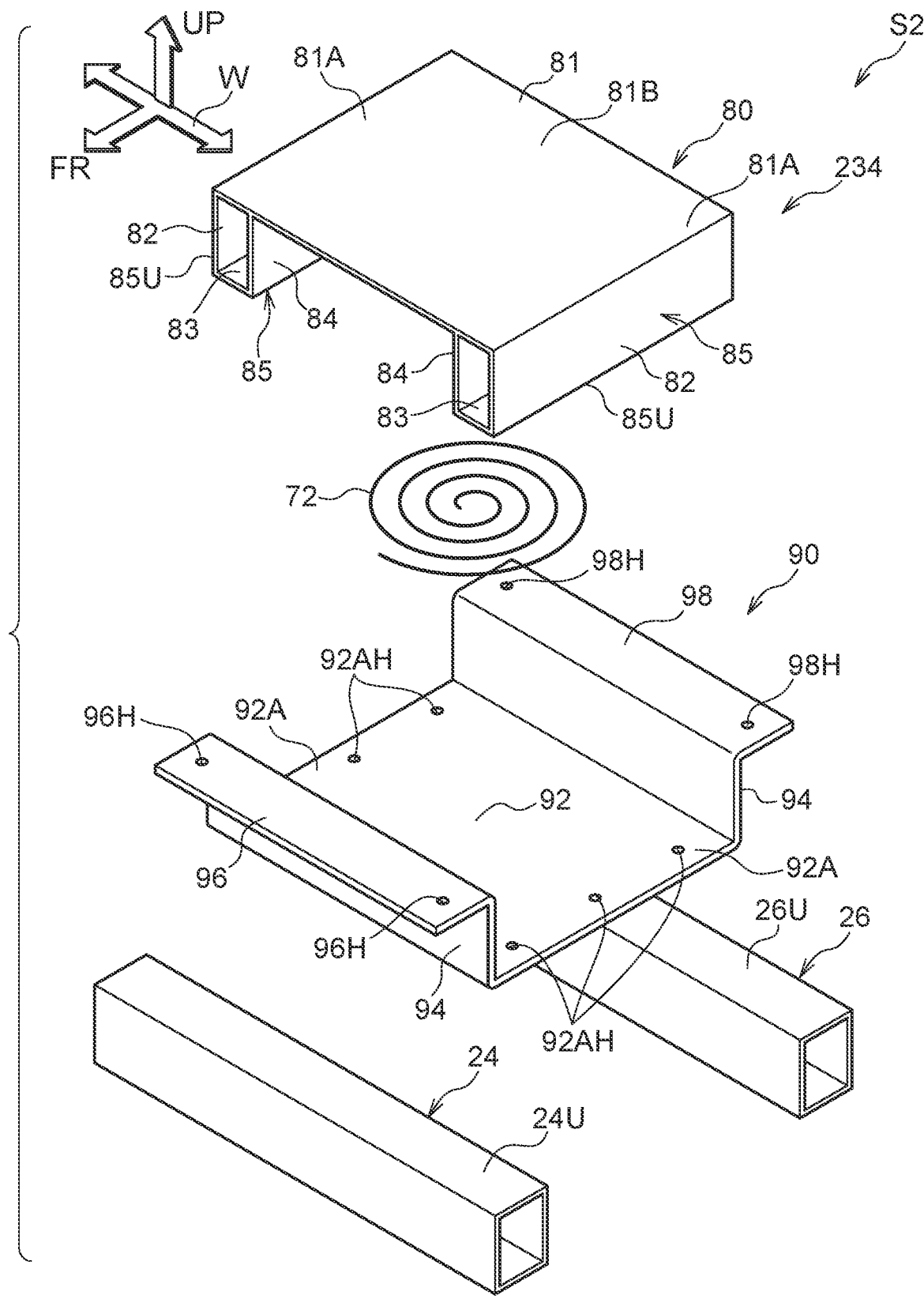
FIG. 10 is an exploded perspective view showing a non-contact charger of a second embodiment, together with the front cross and the rear cross of the suspension member.

A vehicle front portion structure S2 of a second embodiment of the present disclosure is described next by using FIGS. 10 through 12.

The point of the second embodiment that differs from the first embodiment is only the structure of a non-contact charger 234. Therefore, in the following description, the structure of the non-contact charger 234 of the second embodiment is described, and other structures that are similar to those of the first embodiment are denoted by the same reference numerals in the drawings, and description thereof is omitted.

The non-contact charger 234 of the second embodiment is structured to include a frame member 80 and a frame supporting member 90. The frame member 80 is formed by extrusion molding aluminum. The frame member 80 has a pair of left and right longitudinal direction frames 85, and a connecting portion 81B that connects the upper end portions of the pair of left and right longitudinal direction frames 85.

To describe this in a different way, the frame member 80 has a ceiling plate portion 81 and reinforcing portions 85U that are formed at the lower side of the ceiling plate portion 81. The ceiling plate portion 81 is shaped as a flat plate that is substantially rectangular. The reinforcing portions 85U are formed as a left/right pair at the vehicle transverse direction both end portions of the ceiling plate portion 81. The reinforcing portions 85U are provided with the length directions thereof being the longitudinal direction, and the lateral cross-sectional shapes thereof are substantial U-shapes that open toward the upper side. In detail, the reinforcing portion 85U has an outer plate portion 82 that is at the vehicle transverse direction outer side, a bottom plate portion 83 that is at the vehicle lower side, and an inner plate portion 84 that is at the vehicle transverse direction inner side. Further, the ceiling plate portion 81 is connected to the portions where the cross-sectional U-shapes are open (the upper ends of the outer plate portions 82 and the upper ends of the inner plate portions 84). Due thereto, the longitudinal direction frames 85, which are closed cross-sectional structures having rectangular cross-sections, are formed by the reinforcing portions 85U and by portions 81A, which are at the vehicle transverse direction both sides, of the ceiling plate portion 81. The portion 81B, where the reinforcing portions 85U are not formed, of the ceiling plate portion 81 is the connecting portion 81B, and functions as a shield portion that is disposed above the power receiving coil 72. Namely, the frame member 80 can be called a member that integrally has the pair of left and right longitudinal direction frames 65 and a shield portion.

On the other hand, the frame supporting member 90 is formed of resin. The cross-sectional shape orthogonal to the vehicle transverse direction of the frame supporting portion 90 is an upside-down hat shape. Namely, the frame supporting member 90 has a bottom plate portion 92 that is disposed at the lower side of the frame member 80, a pair of front and rear vertical wall portions 94 that stand erect upwardly from the longitudinal direction both ends of the bottom plate portion 92, and a first joining portion 96 and a second joining portion 98 that respectively extend-out toward the longitudinal direction outer sides from the upper ends of the pair of front and rear vertical wall portions 94.

Figure 11:
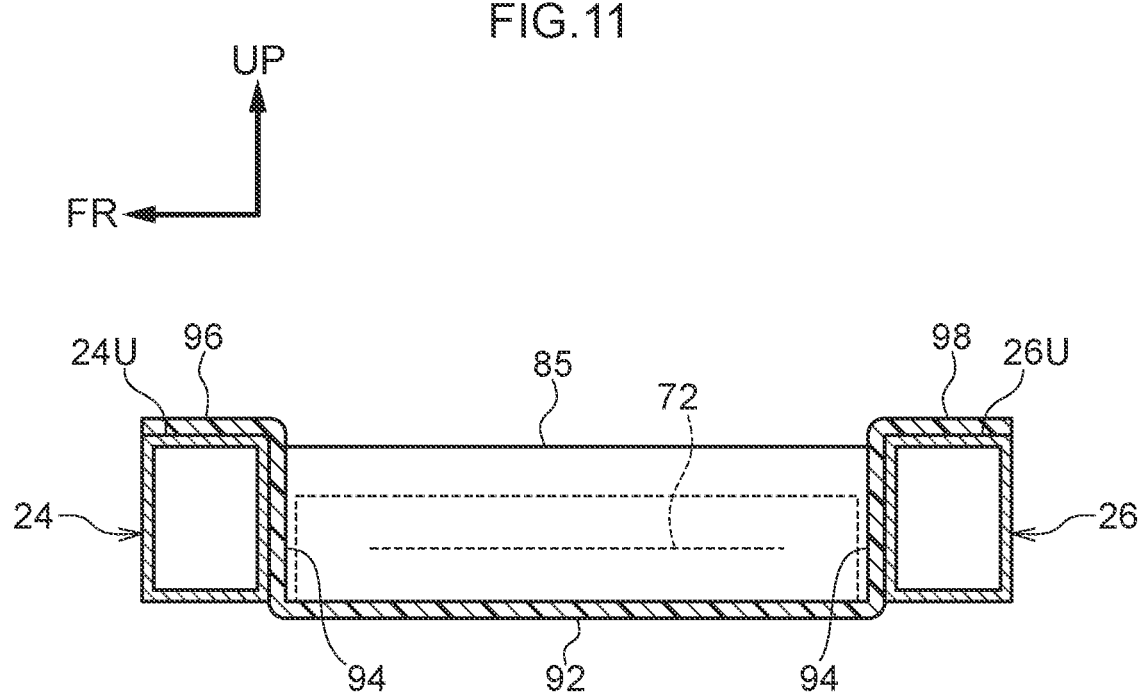
FIG. 11 is a cross-sectional view, that corresponds to FIG. 7, in the second embodiment.
Figure 12:
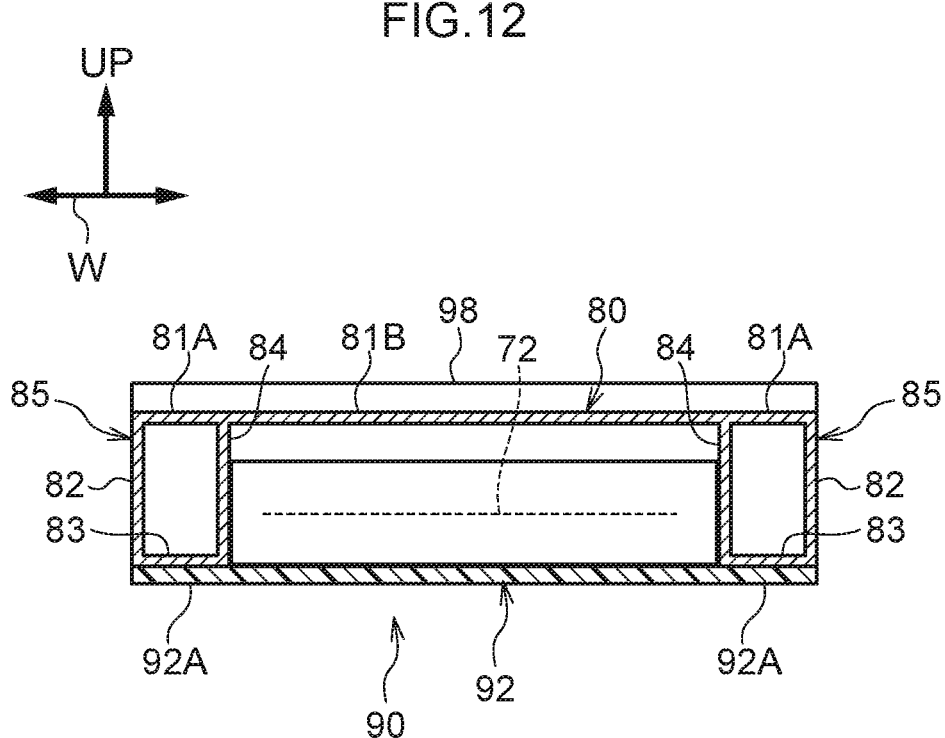
FIG. 12 is a cross-sectional view, that corresponds to FIG. 8, in the second embodiment.

The frame member 80 is disposed at the upper side of the bottom plate portion 92, between the pair of front and rear vertical wall portions 94 (see FIG. 11). The bottom plate portion 92 is shaped as a flat plate that is rectangular. The vehicle transverse direction both side portions of the bottom plate portion 92 are frame supporting portions 92A that support the longitudinal direction frames 85. Fastening holes 92AH for fastening to the frame member 80 are formed in the frame supporting portions 92A. The plural fastening holes 92AH are formed so as to be lined-up in the longitudinal direction. The longitudinal direction frames 85 of the frame member 80 are both fastened in states of being disposed above the frame supporting portions 92A of the frame supporting member 90.

The plate thickness directions of the first joining portion 96 and the second joining portion 98 are the vertical direction. The first joining portion 96 is disposed at a top surface 24U of the front cross 24 of the suspension member 20, and the second joining portion 98 is disposed at a top surface 26U of the rear cross 26 of the suspension member 20. Further, the both are joined by fastening by using fastening holes 96H, 98H of the first joining portion 96 and the second joining portion 98.

The bottom plate portion 92 of the frame supporting member 90 is disposed at the lower side of the power receiving coil 72, and structures the bottom surface of the non-contact charger 34. Namely, the frame supporting member 90 functions as a resin cover that has the charger bottom surface (the bottom plate portion 92), and also functions to support the longitudinal direction frames 85.

Operation and Effects

Operation and effects of the present embodiment are described next.

In the present embodiment, the first joining portion 96 and the second joining portion 98 of the frame supporting member 90 are in states of being disposed at the top surfaces 24U, 26U of the front cross 24 and the rear cross 26 of the suspension member 20. Therefore, the both can be joined in a state in which the non-contact charger 34 is set on the front cross 24 and the rear cross 26 of the suspension member 20, and the work of mounting the charger to the vehicle body is easy.

Further, in the present embodiment, the longitudinal direction frames 85 and the shield portion 81B are formed integrally as the frame member 80. Namely, by mounting the frame member 80 to the frame supporting member 90, the non-contact charger 234 can be provided with the longitudinal direction frames 65 and the shield portion 81B. Therefore, the number of parts can be reduced as compared with a form in which the longitudinal direction frames 65 and the shield portion 81B are made to be separate parts.

Further, in the present embodiment, the longitudinal direction frames 85 are disposed between the front cross 24 and the rear cross 26 of the suspension member 20. In particular, the longitudinal direction frames 85 are closed cross-sectional structures, and all of the bottom plate portions 83, the outer plate portions 82, the top plate portions 81A and the inner plate portions 84 that structure the closed cross-sections overlap the front cross 24 and the rear cross 26 of the suspension member 20 as seen in a vehicle front view. Therefore, at the time of a front collision, due to the longitudinal direction frames 85 being nipped-in by the front cross 24 and the rear cross 26 of the suspension member 20, the longitudinal direction frames 85 can be axially compressively deformed or can be bendingly deformed. Accordingly, the collision energy can be absorbed effectively.

SUPPLEMENTAL DESCRIPTION OF ABOVE EMBODIMENTS

Note that, in the first embodiment, a height adjusting member may be set between the charger bottom surface (the bottom plate portion 74L) of the charger main body 70 and the main body supporting portions 61C of the pair of left and right main body supporting members 60. The height position of the charger bottom surface (the bottom plate portion 74L) can thereby be adjusted. For example, by adjusting the height position of the charger bottom surface (the bottom plate portion 74L), the first vehicle body frame and the second vehicle body frame may be made to project-out further toward the lower side than the charger bottom surface (the bottom plate portion 74L). In this case, a curb or the like directly colliding with the charger main body 70 when the vehicle is advancing forward or traveling in reverse or the like can be suppressed effectively. Further, also in a case in which a curb or the like is about to hit the charger from the lower side, the charger main body 70 being damaged by the curb or the like can be suppressed effectively.

Figure 13:
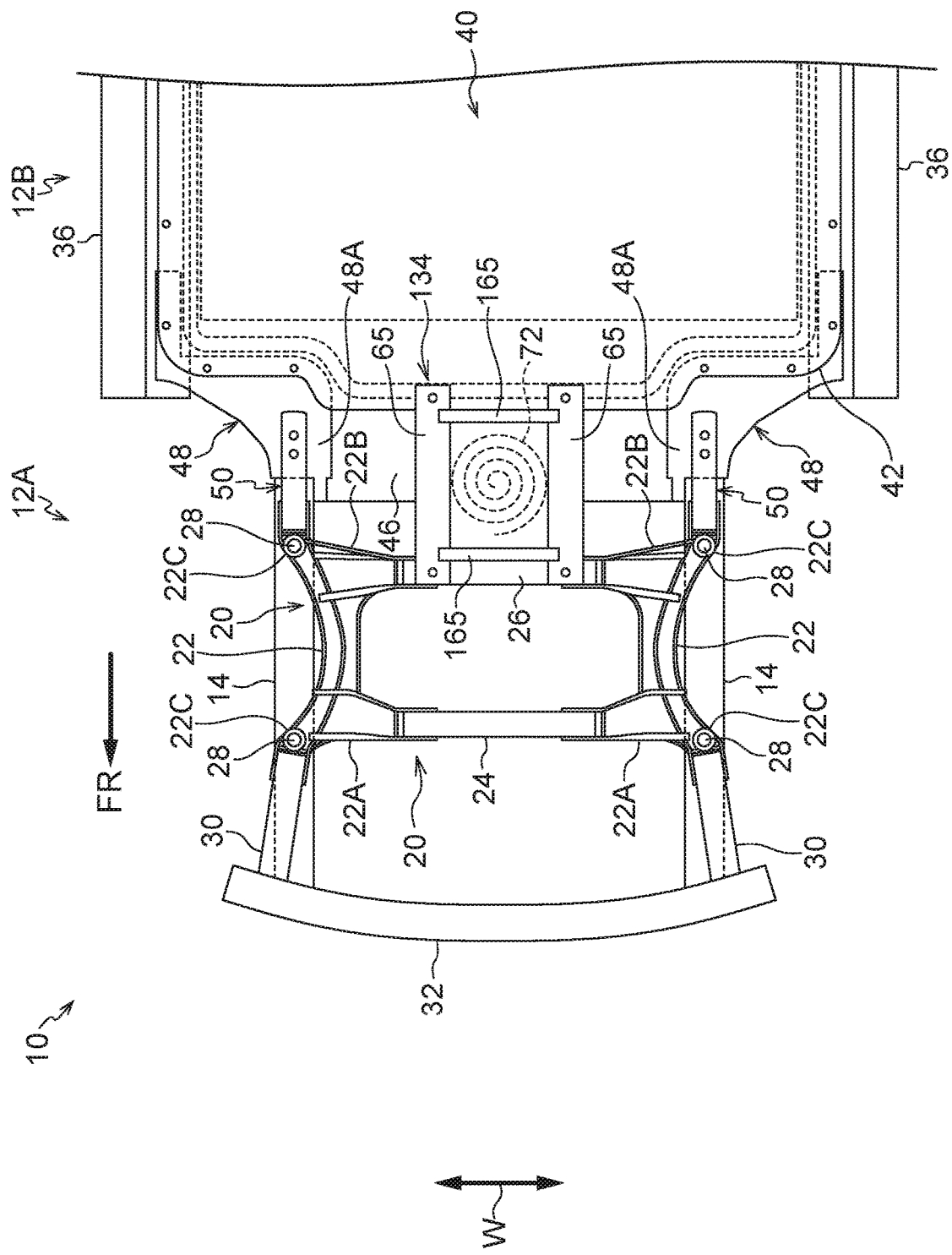
FIG. 13 is a bottom view that is seen from the vehicle lower side and shows a modified example of a mounted position of the non-contact charger.

Further, the above embodiments describe examples in which the front side of the non-contact charger 34 is joined to the front cross 24 of the suspension member 20, and the rear side is joined to the rear cross 26 of the suspension member 20. However, the present disclosure is not limited to this. For example, instead of the structures of the above-described embodiments, there may be a structure in which the front side of the non-contact charger 34 is joined to the rear cross 26 of the suspension member, and the rear side is joined to the dash cross 46 that extends in the vehicle transverse direction at the front side of the battery pack 40 (see FIG. 13). In this case, the collision load that is inputted to the suspension member 20 can be effectively transmitted to the dash cross 46.

Further, the first embodiment describes an example in which the main body supporting members 60 are formed by bending plate members of aluminum, and the second embodiment describes an example in which the frame member 80 is formed by extrusion molding aluminum. Instead, the main body supporting members 60 may be manufactured by extrusion molding aluminum, and the frame member 80 may be manufactured by bending a plate member. Further, the materials of the main body supporting members 60 and the frame member 80 are not limited to aluminum, and may be another material.

Further, the above-described embodiments describe examples in which the longitudinal direction frames 65, 85 are disposed between the front cross 24 of the suspension member 20 that serves as the "first vehicle body frame" and the rear cross 26 that serves as the "second vehicle body frame". However, the present disclosure is not limited to this. For example, the non-contact charger may be disposed further toward the vehicle lower side than in the structures of the above-described embodiments, and the longitudinal direction frames do not have to be disposed between the first vehicle body frame and the second vehicle body frame. In this case, it is preferable that the non-contact charger have the transverse direction frames 165 (see FIG. 9).

A first aspect is a vehicle front portion structure that includes: a first vehicle body frame that extends in a vehicle transverse direction at a vehicle front portion; a second vehicle body frame that is positioned at a rear side of the first vehicle body frame, and that extends in the vehicle transverse direction at the vehicle front portion; and a non-contact charger having a front side part that is joined to the first vehicle body frame and having a rear side part that is joined to the second vehicle body frame. The non-contact charger includes: a power receiving coil, a cover having a charger bottom surface that is positioned beneath the power receiving coil, and a pair of left and right longitudinal direction frames that respectively extend in a vehicle longitudinal direction at left and right sides of the power receiving coil.

In the vehicle front portion structure of the first aspect, the first vehicle body frame and the second vehicle body frame extend in the vehicle transverse direction at the vehicle front portion. The second vehicle body frame is positioned at the rear of the first vehicle body frame.

Further, there is provided the non-contact charger that has the power receiving coil and the cover that has a charger bottom surface positioned beneath the power receiving coil. The front side of the non-contact charger is joined to the first vehicle body frame, and the rear side of the non-contact charger is joined to the second vehicle body frame.

Therefore, at the time of a front collision, load that is inputted to the first vehicle body frame is transmitted via the non-contact charger to the second vehicle body frame.

Moreover, the non-contact charger is structured to further include the pair of left and right longitudinal direction frames that extend in the vehicle longitudinal direction at the left and right both sides of the power receiving coil.

Therefore, the load, which is inputted to the first vehicle body frame at the time of a front collision, can effectively be transmitted to the second vehicle body frame via the longitudinal direction frames.

In a vehicle front portion structure of a second aspect, in the vehicle front portion structure of the first aspect, the longitudinal direction frames are closed cross-sectional structures.

A second aspect is the first aspect of the vehicle front portion structure. The longitudinal direction frames are closed cross-sectional structures.

A third aspect is the first or the second aspect of the vehicle front portion structure. The non-contact charger further includes a pair of front and rear transverse direction frames that respectively extend in the vehicle transverse direction at front and rear sides of the power receiving coil, and the transverse direction frames project further toward a lower side than the charger bottom surface.

At times when the vehicle is advancing forward or is traveling rearward, there is the concern that a curb or the like will directly collide with the charger.

Thus, the vehicle front portion structure of the third aspect further includes a pair of front and rear transverse direction frames. The pair of front and rear transverse direction frames extend in the vehicle transverse direction at the front and rear both sides of the power receiving coil, and project-out further toward the lower side than the charger bottom surface. Therefore, at times when the vehicle is advancing forward or is traveling rearward, a curb or the like directly colliding with the non-contact charger is suppressed.

A fourth aspect is any one of the first to the third aspect of the vehicle front portion structure. The pair of left and right longitudinal direction frames project further toward a lower side than the charger bottom surface.

There are cases in which the charger rides-up on a curb or the like due to movement of the vehicle. In other words, there are cases in which a curb or the like is about to hit the charger from the lower side.

Thus, in the vehicle front portion structure of the fourth aspect, the pair of left and right longitudinal direction frames project-out further toward the lower side than the charger bottom surface.

Therefore, even if a curb or the like is about to hit the charger from the lower side, the charger bottom surface being damaged by the curb or the like is suppressed.

A fifth aspect is any one of the first to the fourth aspect of the vehicle front portion structure. The first vehicle body frame and the second vehicle body frame project further toward a lower side than the charger bottom surface.

In the vehicle front portion structure of the fifth aspect, the first vehicle body frame and the second vehicle body frame project-out further toward the lower side than the charger bottom surface. Therefore, a curb or the like directly colliding with the cover or the like of the non-contact charger can be effectively suppressed by the first vehicle body frame and the second vehicle body frame.

A sixth aspect is any one of the first to the fifth aspect of the vehicle front portion structure. The longitudinal direction frames are disposed between the first vehicle body frame and the second vehicle body frame.

In the vehicle front portion structure of the sixth aspect, the pair of left and right longitudinal direction frames are disposed between the first vehicle body frame and the second vehicle body frame. Due thereto, at the time of a front collision, the collision energy can be absorbed effectively by utilizing the longitudinal direction frames.

Namely, due to the longitudinal direction frames being disposed between the first vehicle body frame and the second vehicle body frame, at the time of a front collision, it is easy for the longitudinal direction frames to be nipped between the first vehicle body frame and the second vehicle body frame. Due to the longitudinal direction frames being nipped between the first vehicle body frame and the second vehicle body frame, the longitudinal direction frames can be axially compressed or bendingly deformed. Due thereto, the collision energy can be absorbed effectively.

A seventh aspect is any one of the first to the sixth aspect of the vehicle front portion structure. The first vehicle body frame includes a front cross of a suspension member, and the second vehicle body frame includes a rear cross of the suspension member.

In the vehicle front portion structure of the seventh aspect, the front side of the non-contact charger is joined to the front cross of the suspension member, and the rear side is joined to the rear cross of the suspension member. Therefore, due to the non-contact charger being installed, the rigidity of the suspension member with respect to load in the longitudinal direction can be improved effectively.

An eighth aspect is any one of the first to the sixth aspect of the vehicle front portion structure. The first vehicle body frame includes a rear cross of a suspension member, and the second vehicle body frame comprises a dash cross that extends in the vehicle transverse direction at a front side of a battery pack that is installed beneath a vehicle floor portion.

In the vehicle front portion structure of the eighth aspect, the front side of the non-contact charger is joined to the rear cross of the suspension member, and the rear side is joined to the dash cross that extends in the vehicle transverse direction at the front side of the battery pack. Therefore, load that is inputted to the suspension member can be transmitted effectively to the dash cross.

A ninth aspect is any one of the first to the eighth aspect of the vehicle front portion structure that further includes a cover supporting member that is joined to the first vehicle body frame and the second vehicle body frame and that supports the cover. The longitudinal direction frames are portions of the cover supporting member.

In the vehicle front portion structure of the ninth aspect, the cover supporting member, which is joined to the first vehicle body frame and the second vehicle body frame, supports the cover of the non-contact charger. The longitudinal direction frames are provided as portions of this cover supporting member, and the longitudinal direction frames contribute to the transmission of collision load.

A tenth aspect is any one of the first to the eighth aspect of the vehicle front portion structure that further includes a frame supporting member that is joined to the first vehicle body frame and the second vehicle body frame and that supports the longitudinal direction frames. The cover is a portion of the frame supporting member.

In the vehicle front portion structure of the tenth aspect, the frame supporting member, which is joined to the first vehicle body frame and the second vehicle body frame, supports the longitudinal direction frames. The cover, which has the charger bottom surface that is positioned beneath the power receiving coil, is provided as a portion of this frame supporting member.

As described above, the present disclosure can, in a vehicle front portion structure that is equipped with a non-contact charger, effectively transmit collision load at the time of a front collision.

What is claimed is:
1. A vehicle front portion structure, comprising:
   a first vehicle body frame that extends in a vehicle transverse direction at a vehicle front portion;
   a second vehicle body frame that is positioned at a rear side of the first vehicle body frame, and that extends in the vehicle transverse direction at the vehicle front portion; and
   a non-contact charger having a front side part that is joined to the first vehicle body frame and having a rear side part that is joined to the second vehicle body frame,
   wherein the non-contact charger comprises:
   a power receiving coil,
   a cover having a charger bottom surface that is positioned beneath the power receiving coil, and
   a pair of left and right longitudinal direction frames that respectively extend in a vehicle longitudinal direction at left and right sides of the power receiving coil,
   wherein the first vehicle body frame includes a rear cross of a suspension member, and
   wherein the second vehicle body frame comprises a dash cross that extends in the vehicle transverse direction at a front side of a battery pack that is installed beneath a vehicle floor portion.

2. The vehicle front portion structure of claim 1, wherein the pair of left and right longitudinal direction frames are closed cross-sectional structures.

3. The vehicle front portion structure of claim 1, wherein:
   the non-contact charger further comprises a pair of front and rear transverse direction frames that respectively extend in the vehicle transverse direction at front and rear sides of the power receiving coil, and
   the pair of front and rear transverse direction frames project further toward a lower side than the charger bottom surface.

4. The vehicle front portion structure of claim 1, wherein the pair of left and right longitudinal direction frames project further toward a lower side than the charger bottom surface.

5. The vehicle front portion structure of claim 1, wherein the first vehicle body frame and the second vehicle body frame project further toward a lower side than the charger bottom surface.

6. The vehicle front portion structure of claim 1, wherein the pair of left and right longitudinal direction frames are disposed between the first vehicle body frame and the second vehicle body frame.

7. The vehicle front portion structure of claim 1, further comprising a cover supporting member that is joined to the first vehicle body frame and the second vehicle body frame and that supports the cover, wherein the pair of left and right longitudinal direction frames are portions of the cover supporting member.

8. The vehicle front portion structure of claim 1, further comprising a frame supporting member that is joined to the first vehicle body frame and the second vehicle body frame and that supports the pair of left and right longitudinal direction frames, wherein the cover is a portion of the frame supporting member.

9. The vehicle front portion structure of claim 8, wherein:
   the frame supporting member comprises a bottom plate portion, a pair of front and rear vertical wall portions that respectively stand erectly upward from longitudinal direction ends of the bottom plate portion, and a first joining portion and a second joining portion that respectively extend out toward longitudinal direction outer sides from upper ends of the pair of front and rear vertical wall portions,
   the first joining portion is disposed at a top surface of a first frame portion, and
   the second joining portion is disposed at a top surface of a second frame portion.

10. A vehicle front portion structure, comprising:
   a first vehicle body frame that extends in a vehicle transverse direction at a vehicle front portion;
   a second vehicle body frame that is positioned at a rear side of the first vehicle body frame, and that extends in the vehicle transverse direction at the vehicle front portion; and
   a non-contact charger having a front side part that is joined to the first vehicle body frame and having a rear side part that is joined to the second vehicle body frame,
   wherein the non-contact charger comprises:
   a power receiving coil,
   a cover having a charger bottom surface that is positioned beneath the power receiving coil,
   a pair of left and right longitudinal direction frames that respectively extend in a vehicle longitudinal direction at left and right sides of the power receiving coil,
   main body supporting members having main body supporting portions that support a charger main body, and a height of the charger bottom surface is adjusted by a device that is disposed between the main body supporting portions and the charger bottom surface.

11. The vehicle front portion structure of claim 10, wherein:
the first vehicle body frame comprises a front cross of a suspension member, and
the second vehicle body frame comprises a rear cross of the suspension member.

* * * * *